Nov. 23, 1971  W. K. OJALA  3,621,825
EXHAUST GAS RECIRCULATION CONTROL VALVE
Filed July 27, 1970
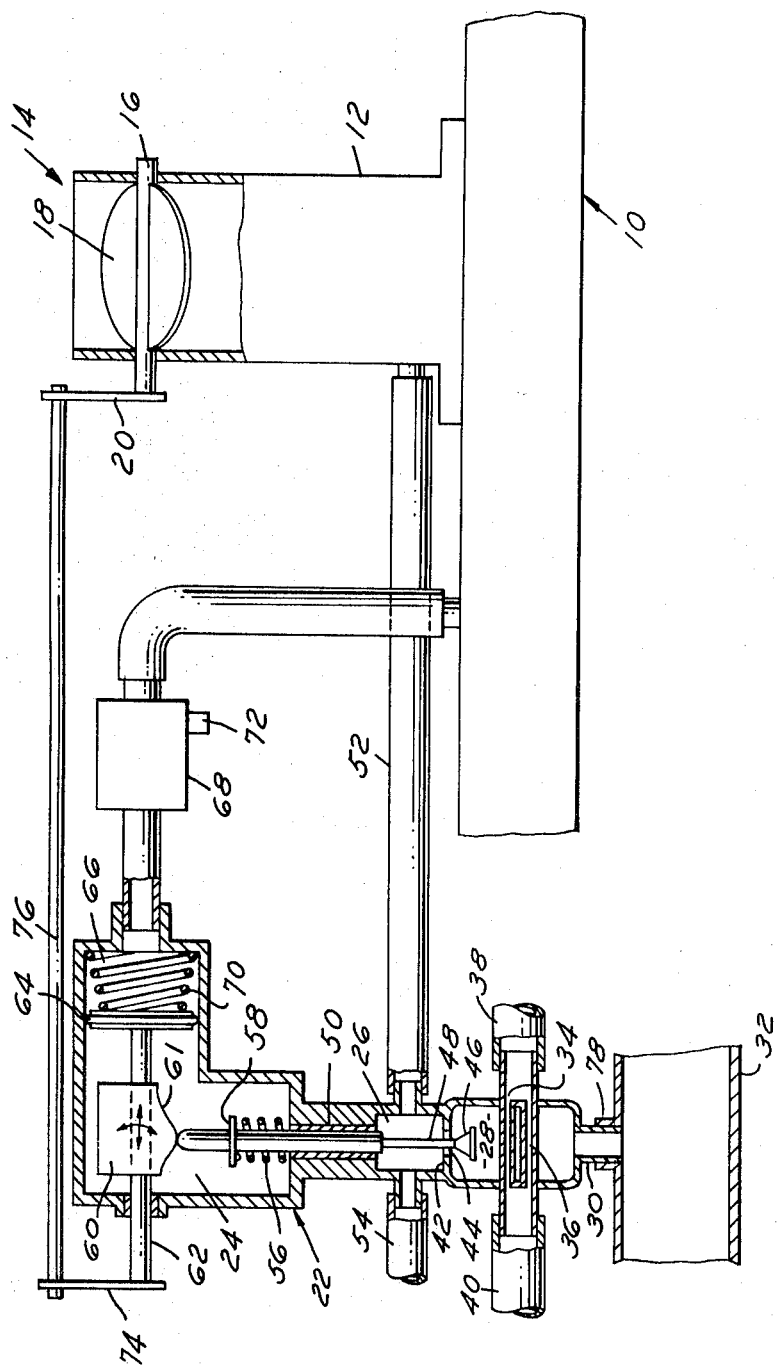
INVENTOR
WILLIAM K. OJALA
BY
John R. Faulkner
Glenn S. Arendsen
ATTORNEYS

3,621,825
EXHAUST GAS RECIRCULATION CONTROL VALVE

William K. Ojala, Dearborn Heights, Mich., assignor to Ford Motor Company, Dearborn, Mich.
Filed July 27, 1970, Ser. No. 58,511
Int. Cl. F02m 25/06, 31/08
U.S. Cl. 123—119 R                    8 Claims

ABSTRACT OF THE DISCLOSURE

Exhaust gases of an internal combustion engine are inducted back into the intake manifold in quantities controlled by an integral valve mechanism responsive to throttle blade opening and intake manifold pressure. A heat exchanger built into the valve mechanism reduces the temperature of the recirculating exhaust gases to provide further reductions in oxides of nitrogen.

SUMMARY OF THE INVENTION

Recirculating small quantities of the exhaust gases of internal combustion engines significantly reduces the gases emitted to the atmosphere. The quantity of recirculation seriously affects engine operability however, particularly during certain modes of engine operation. Considerable disagreement has arisen over which modes should have what quantity of exhaust gas recirculation to achieve the best combination of engine performance; economy and emission. Additionally, most prior art systems required several individual mechanisms to provide overall control of recirculation during all phases of engine operation and each engine required individual structure and calibration of each mechanism. The corrosive nature and high temperature of the exhaust gases also reduced the useful life of the components making up the recirculating system.

A mechanically simple, entirely integrated valve mechanism serves as the heart of the exhaust gas recirculation system provided by this invention. The housing of the control valve contains a cam movable both rotatably and axially. A valve member positioned by the cam controls the flow of exhaust gases through a passage connecting the engine exhaust manifold with its intake manifold. A vacuum motor attached to the cam responds to intake manifold pressure to move the cam axially and mechanical linkage connects the cam with the throttle blade controlling air flow to the engine intake manifold to rotate the cam about its axis in response to the position of the throttle blade.

A heat exchanger integral with the housing of the valve mechanism utilizes engine coolant to reduce the temperature of the exhaust gases entering the housing. The temperature of the recirculating exhaust gases preferably is held below about 250° F. to prolong the life of the valve mechanism and further reduce undesirable emissions. A poppet type valve preferably is used as the valve member. The poppet valve is movable into the heat exchanging chamber from a valve seat located in a wall separating the heat exchanging chamber from a mixing chamber connected directly to the engine intake manifold. Vapors from the engine crankcase are admitted to the mixing chamber where the vapors mix with recirculating exhaust gases before entering the engine intake manifold.

BRIEF DESCRIPTION OF THE DRAWING

The drawing is a schematic of the recirculating system of this invention and includes a sectional view of the valve mechanism showing the relationship of the cam poppet valve and the mixing and heat exchanging chambers.

DETAILED DESCRIPTION

Referring to the drawing, the intake manifold 10 of an internal combustion engine has a carburetor 12 mounted thereon. Carburetor 12 contains an air induction passage 14 that connects with a passage in the intake manifold to conduct air to a combustion chamber of the engine. A throttle blade shaft 16 is mounted rotatably in carburetor 12 and a throttle blade 18 is fastened to shaft 16 within induction passage 14 where the throttle blade controls air flow through the induction passage. A lever arm 20 is fastened to shaft 16 on the exterior of the carburetor 12.

The housing 22 of an exhaust gas recirculation control valve contains an upper L-shaped chamber 24, an intermediate mixing chamber 26 and a lower heat exchanging chamber 28. A short conduit 30 connects heat exchanging chamber 28 with the engine exhaust manifold 32. Conduit 30 preferably is made of a material having a low coefficient of thermal conductivity to reduce heat conduction to housing 22.

Heat exchanging chamber 28 contains a plurality of small tubes 34 and 36 that are connected by conduits 38 and 40 to the engine cooling system. During engine operation, engine coolant flows through tubes 34 and 36 to remove heat from any exhaust gases flowing through chamber 28. Chamber 28 and tubes 34 and 36 preferably are designed so the maximum temperature of the recirculating exhaust gases reaching the intake manifold does not exceed about 250° F.

A wall 42 having an opening 44 therein separates chamber 28 from chamber 26. Wall 42 forms a valve seat around opening 44 for a poppet type valve member 46. The head of valve member 46 is located in chamber 28 and a stem 48 connected to the head extends upward through chamber 26 and into chamber 24. A sleeve bearing 50 surrounds and guides the portion of valve stem 48 extending through the housing between chambers 26 and 24. A conduit 52 connects mixing chamber 26 with induction passage 14 of carburetor 12. Another conduit 54 connects chamber 26 with the conventional positive crankcase ventilation valve member (not shown) which in turn is connected to the engine crankcase (not shown).

Within chamber 24, a spring 56 acts on a retainer 58 that is fastened to the upper portion of valve stem 48 so the spring urges the head of the valve upwardly to its seat. A three dimensional cam member 60 is mounted on a shaft 62 extending at a right angle to the axis of valve stem 48 so the cam surface of cam member 60 contacts the tip of the valve member. The internal end of shaft 62 is connected to a piston 64 mounted movably in one leg of chamber 24. Piston 64 forms one wall of a small vacuum chamber 66 that is connected through a temperature sensitive valve 68 to the intake manifold 10. A spring 70 located in chamber 66 urges piston 64 out of chamber 66. Valve 68 contains an air bleed port 72 opening into the atmosphere. A portion of shaft 62 projects outside of housing 22 where it is fastened to a lever 74. A rod 76 connects lever 74 with lever 20.

Cam 60 has a contoured surface 61 that provides exhaust gas recirculation during those phases of engine operation in which it is most effective in reducing undesirable emissions and least detrimental to engine operation and performance. At low engine temperatures such as those encountered during cold starting and warmup, recirculation is relatively ineffective. Temperature sensing valve 68 connects vacuum chamber 66 to the atmosphere through port 72 whenever engine temperature is below about 120° F. and spring 70 then moves cam 60 to the far left position so valve stem 48 contacts the cam surface near the right edge, thereby closing the valve. When the engine exceeds that temperature, valve 68 connects chamber 66 to the intake manifold 10 and the low manifold pressure draws cam 60 toward the right so valve stem 48 contacts the central portion of the cam. Relative axial movement between cam 60 and throttle blade 18 is provided by a slipping connection between shaft 62 and lever 74.

During engine idling, the closed throttle blade rotates cam 60 to a position where valve member 46 remains closed. At mild accelerations, throttle blade movement and rising manifold pressure moves the cam to a position where the valve member begins opening to provide for some exhaust gas recirculation. At higher and higher accelerations, the rising manifold pressure moves cam 60 toward the left to modulate the amount of valve opening until at relatively high power demands the valve again is completely closed.

During road load cruise conditions, engine valve overlap usually provides some inherent exhaust recirculation. It is desirable therefore to minimize exhaust gas recirculation through the valve mechanism of this invention, which is accomplished by permitting the manifold pressures appearing in chamber 66 to move the cam to a position where the valve member is closed.

The amount of recirculating exhaust gas depends on the valve opening and the different between exhaust manifold pressure and intake manifold pressure. Exhaust manifold pressure in turn depends primarily on throttle blade opening. Since the instantaneous position of cam 60 is determined by the throttle blade position and the intake manifold pressure, the contour of surface 61 can be selected to achieve desired recirculation amounts throughout virtually all phases of engine operation.

Poppet valve 46 is the only moving element of the mechanism that is exposed to exhaust gases. By positioning the poppet valve so it is downstream of the heat exchanger as shown, the valve operates in a relatively cool environment that extends its life considerably. An insulating sleeve 78 can be used to connect housing 22 to the exhaust manifold to prevent excessive heat conduction through the housing walls.

Thus this invention provides an integral control valve capable of satisfying all exhaust gas recirculation requirements. The contral valve can be tailored to various engine requirements merely by substituting alternate cams having emperically determined cam surfaces. Vehicles already in the field can be modified to use the valve for exhaust gas recirculation since the valve can be installed readily on a completely assembled engine.

I claim:

1. In an exhaust gas recirculation system for an internal combustion engine having an intake means for conducting air to a combustion chamber, a throttle means for controlling the flow of said air to the combustion chamber, a crankcase, an exhaust means for conducting exhaust gases out of the combustion chamber, and passage means for recirculating exhaust gases from said exhaust means to said intake means, a recirculation control valve in said passage means comprising
   a housing,
   a cam located in said housing and valve member positioned by said cam, said valve member controlling the flow of exhaust gases through said passage means,
   a vacuum motor attached to said cam, said vacuum motor responding to intake manifold pressure to move said cam along one exis, and
   linkage means connecting said cam with said throttle means for rotating said cam about said axis in response to the position of the throttle means.

2. The system of claim 1 in which said housing includes a first chamber and a second chamber, said valve member connecting said first chamber to said second chamber, said first chamber including means for cooling exhaust gases passing through said first chamber.

3. The system of claim 2 in which said second chamber is connected directly to said intake means downstream of said throttle blade and comprising passage means connecting said engine crankcase to said second chamber.

4. The system of claim 3 in which the cooling means in said first chamber is connected to a cooling system for said engine.

5. The system of claim 4 in which the valve member is a poppet valve movable into said first chamber to connect the first chamber with the second chamber.

6. The system of claim 5 comprising a temperature sensing valve means for disconnecting said vacuum motor from said intake manifold at temperatures below a predetermined value.

7. The system of claim 1 in which the valve member is a poppet valve.

8. The system of claim 1 comprising a temperature sensing valve means for disconnecting said vacuum motor from said intake manifold at temperatures below a predetermined value.

References Cited

UNITED STATES PATENTS

| | | | |
|---|---|---|---|
| 2,722,927 | 11/1955 | Cornelius | 123—119 A |
| 3,513,816 | 5/1970 | Daigh | 123—119 A |

WENDELL E. BURNS, Primary Examiner

U.S. Cl. X.R.

123—119A, 119B